May 5, 1959

I. GOODBAR 2,884,834

PROJECTION SCREEN

Filed Aug. 9, 1955

INVENTOR
Isaac Goodbar,

BY Hall & Houghton,

ATTORNEY

2,884,834
PROJECTION SCREEN

Isaac Goodbar, Buenos Aires, Argentina

Application August 9, 1955, Serial No. 527,323

1 Claim. (Cl. 88—28.93)

The present invention relates to a new projection screen which permits performances with illuminated surroundings.

The screen in accordance with the invention can be used for any type of projection, such as moving pictures, slides or television. In all cases it offers the important advantage of permitting exhibitions anywhere, even in the open air during the day, for which purpose ordinary projectors can be used, the projector, the screen and the space between them all being in the open.

In the latter instance it is possible also to limit the vision to certain zones, which makes it feasible to collect charges for performances given in public places, such as parks, without having to build fences or other elements to hide the view of the screen.

The present invention furthermore envisages other objects which will be made apparent in the course of the present description.

In order that the invention may be clearly understood and readily put into practice, some preferred embodiments thereof have been shown by way of example in the accompanying drawings, in which, Figure 1 is a diagrammatic view of a screen according to the present invention, from which the position of the public and the projector in relation to it, may be appreciated.

In all these embodiments the screen is of the rear illuminated and front viewed or light transmitting type and includes a smooth surface 1 which must have a high luminous transmittance and low luminous reflectance besides having a diffusion which is variable in different cases. All these characteristics must be independent of the colour of the light. Several known plastic materials satisfy these conditions. Immediately behind this surface 1 there is a louver formed by opaque elements 2 and 3, in general painted frost black. The panes of all these elements pass through the projection lens 5 i.e. they flare at the projection angle.

The thickness of these elements 2 and 3 will be the minimum possible, their width $e$ will be different in different cases and, together with the distances $d$ between the elements 2 or 3, will determine the solid angle S which, approximately, will be:

$$S = \frac{d^2}{e^2}$$

Figure 1:
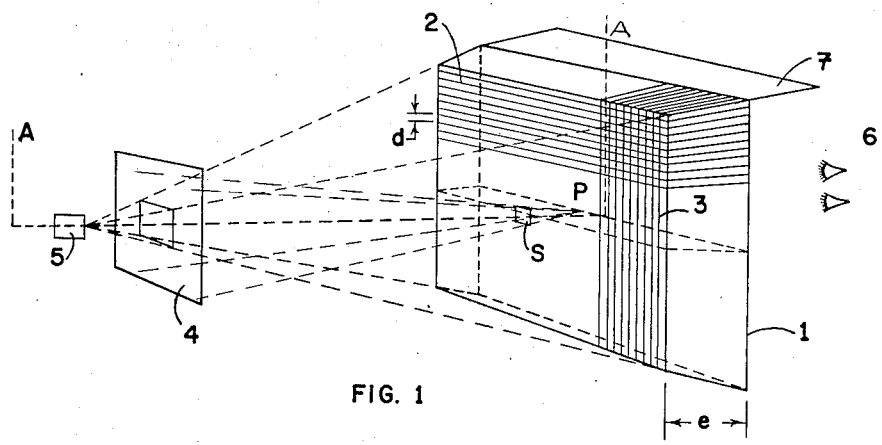
Figure 2:
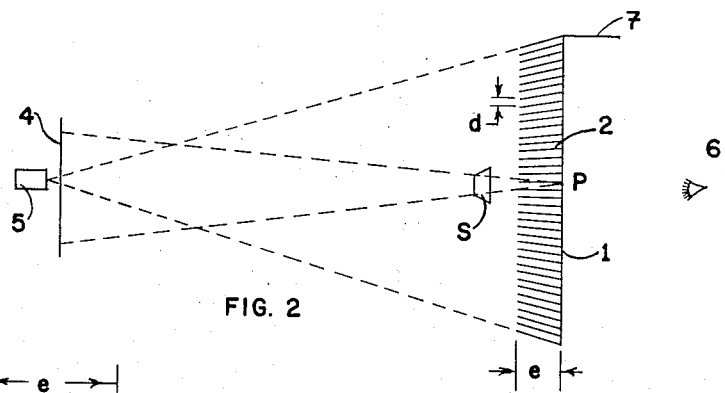
Figure 2 is a sectional view, taken through plane A—A of Figure 1.

The illumination not coming from the projector, which arrives at each point P on the left side (in the figures) of the screen, will be in accordance with the formula:

$$I_a = \frac{Bd^2}{\pi e^2}$$

where B is the brightness in blondels (or footlamberts) of the field of view seen from P and $\pi = 3.1416$. In order to reduce B to a minimum a black screen 4 might be located as shown in Figures 1 and 2.

It will now appear evident that, by a proper choice of $d$ and $e$ and an appropriate reduction of the brightness B by means of the black screen 4, the illumination on every point P of surface 1 due to environment lighting can be made negligible as compared with the illumination due to the projector. Taking into account the high transmission factor of 1, the greatest part of this illumination will cross the surface 1. Thus, as illustrated in Fig. 2, in general when the dimension $e$ in the direction perpendicular to the plane of the screen 1 is relatively larger compared to the spacing $d$ between the elements 2 and 3, the effect of environmental illumination becomes negligible, even though the dimension $e$ is relatively small compared to the distance between the screen 1 and the optical center 5.

The eyes of the public 6 will receive the screen light coming from the projector, that is, the projected image and besides the environment lighting reflected by the surface 1. As this surface 1 has a very low reflection factor, this reflected light will be negligible in comparison with the image. This provides a clear vision of the projected images from zones variable in accordance with the degree of diffusion of 1. Outside of these zones the images will be invisible. Therefore people in cars outside drive-in theatres equipped with these screens and operating in daylight will not see the films even if the screen is not hidden from them. No fences or other elements are therefore necessary.

In order to reduce the illumination on 1 coming from the environment, an opaque shade 7 can be used in general only above, but eventually on all sides.

The operation of the screen in accordance with the present invention, when used as indicated, will be readily understood and requires no further explanation for those skilled in the art.

As usual in background projection, projections will not generally be made as shown but through a mirror or prism, so that the images shall not appear laterally reversed. These prisms or mirrors can also be used, when several projectors are employed to insure the continuity of the performance, to make the virtual lenses occupy the geometric position in the point of convergence of the elements 2 and 3, as shown in the figures.

Obviously a number of structural and detail modifications may be made in the device without departing from the nature and scope of the present invention as defined in the appended claim.

For example, flaringly positioned elements 2 and 3 that are juxtaposed to screen 1 may be unequally separated between themselves and need not be horizontal and vertical as shown in the figures. It is evident that these elements may be inclined in any way and may even have more than two main directions forming hexagons or other figures, but always fulfilling their purpose of affording, in effect, frusto-pyramidal light channels for preventing the illumination of 1 with light coming from the environment.

Figure 4:
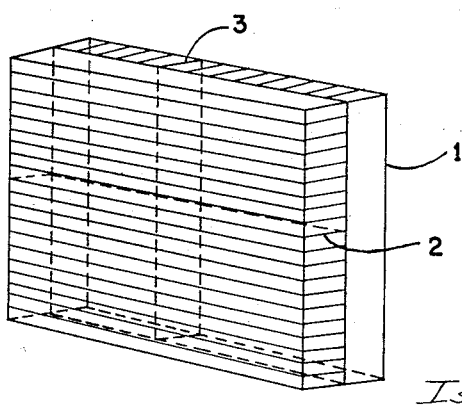
Figure 4 shows a further example.

Manufacture may be simplified, while maintaining the quality of the image by making the flaring light channel defining elements 2 and 3 entirely independent from each other, on separate frames or on the same frame, but on different planes so that they do not cross, as illustrated in Figure 4.

The space between the flaringly positioned opaque elements 2 and 3, instead of air, may contain other transparent materials. As a matter of fact, the whole screen in accordance with the present invention may be made by a single piece of solid transparent material, having one diffusing face and having, within its body, opaque zones corresponding to the frusto-pyramidal light path producing elements 2 and 3 and produced by any photographic, chemical or mechanical means. Many frusto-pyramidal pieces of transparent material placed together so that their sides constitute elements 2 and 3 will achieve the same result.

In many cases, for some environment illuminations, satisfactory results will be obtained with a single set of elements 2 or 3. Also it may be possible to do without the black screens or shades mentioned.

Figure 3:
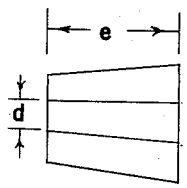
Figure 3 is a sectional view of another embodiment of the present invention.

The appearance of the screen in accordance with the present invention may change fundamentally when the distances $d$ and $e$ are changed. With a few elements 2 and 3 and large distances $d$ and $e$ the appearance of Figure 3 is obtained. Elements 2 and 3 may be coupled to the screen by means other than mechanical and they may even be masonry elements.

The surface 1 does not necessarily have to be plane; it can have any desired curvature to suit special types of projections such as cinemascope and others. The elements 2 and 3 may also be curved provided that they converge in 5.

Having now particularly ascertained and described the nature of the present invention and the manner in which the same is to be performed, what I claim is:

A viewing device of the rear illuminated front viewed type comprising a light transmissive screen of high luminous transmittance and low reflection factor, thin opaque plane elements of low reflection factor juxtaposed to the illuminated rear side of said light transmissive screen, said thin opaque elements having surfaces inclined to converge toward a predetermined optical center from which the projection is to be effected located farther to the rear of said light transmissive screen, said thin opaque elements having dimensions in a direction perpendicular to said screen that are relatively small compared to the distance between said screen and said predetermined optical center but relatively large compared to the mutual spacing of said elements and thus effective to render negligible rear illumination of said screen by light other than that projected from said optical center.

References Cited in the file of this patent

UNITED STATES PATENTS

| | | |
|---|---|---|
| 1,791,573 | Parolini | Feb. 10, 1931 |
| 2,053,173 | Astima | Sept. 1, 1936 |
| 2,388,203 | Zindel | Oct. 30, 1945 |
| 2,398,799 | Miller | Apr. 23, 1946 |

FOREIGN PATENTS

| | | |
|---|---|---|
| 4,480 | Great Britain | Feb. 20, 1913 |